(12) United States Patent
Narigapalli et al.

(10) Patent No.: US 11,553,005 B1
(45) Date of Patent: Jan. 10, 2023

(54) PROVENANCE BASED IDENTIFICATION OF POLICY DEVIATIONS IN CLOUD COMPUTING ENVIRONMENTS

(71) Applicant: Kyndryl, Inc., New York, NY (US)

(72) Inventors: Anil Kumar Narigapalli, Hyderabad (IN); Laxmikantha Sai Nanduru, Secunderabad (IN); Pramod Vadayadiyil Raveendran, Machiplavu (IN); Seema Nagar, Bangalore (IN)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 17/351,737

(22) Filed: Jun. 18, 2021

(51) Int. Cl.
```
G06F 15/173      (2006.01)
H04L 9/40        (2022.01)
H04L 67/10       (2022.01)
```

(52) U.S. Cl.
CPC ........... *H04L 63/20* (2013.01); *H04L 63/101* (2013.01); *H04L 67/10* (2013.01)

(58) Field of Classification Search
CPC ........ H04L 63/20; H04L 63/101; H04L 67/10
See application file for complete search history.

(56) References Cited

U.S. PATENT DOCUMENTS

| | | | |
|---|---|---|---|
| 8,402,514 B1* | 3/2013 | Thompson | H04L 63/08 |
| | | | 726/4 |
| 10,546,121 B2 | 1/2020 | Brech et al. | |
| 11,347,716 B1* | 5/2022 | Fischer | G06F 3/04842 |
| 2016/0164884 A1* | 6/2016 | Sriram | G06Q 10/06315 |
| | | | 705/51 |
| 2017/0017708 A1* | 1/2017 | Fuchs | G06F 16/288 |
| 2017/0046698 A1* | 2/2017 | Haldenby | G06F 21/645 |
| 2017/0201525 A1* | 7/2017 | Biller | G06N 7/005 |
| 2019/0097807 A1* | 3/2019 | Mahanta | H04L 9/3239 |
| 2020/0057708 A1 | 2/2020 | Joshi et al. | |
| 2020/0412767 A1 | 12/2020 | Crabtree et al. | |

OTHER PUBLICATIONS

Mell et al., "The NIST Definition of Cloud Computing", National Institute of Standards and Technology, Special Publication 800-145. Sep. 2011. pp. 1-7.

(Continued)

*Primary Examiner* — Padma Mundur
(74) *Attorney, Agent, or Firm* — John Kennel; Tutunjian & Bitetto, P.C.

(57) ABSTRACT

Policy deviations for distributed computing environments are detected and recorded an immutable ledger of transaction provenance from end to end transactions performed in the distributed computing environment. From the immutable ledger, persona data for transaction types is plotted as an bipartite graph. Edge weights of the bipartite graphs are correlated to trust levels between personas from the persona data and the transaction types from the immutable ledger. Trust levels from the edge weights are correlated to rules illustrating when the transaction provenance indicate a policy deviation in the distributed computing environment. The rules are then employed to detect in real time end to end provenance when a policy deviation in the distributed computing environment is occurring. An alert of policy deviations may be sent to stakeholders for the distributed computing environment.

13 Claims, 7 Drawing Sheets

(56) References Cited

OTHER PUBLICATIONS

Phaltankar, Kaus, "Caveonix and the IBM Cloud for Financial Services," https://www.caveonix.com/blog/caveonix-and-the-ibm-cloud-for-financial-services, Oct. 2020, 5 pages.

Patel, Sachin, et al., "Data Provenance and Data Lineage in the Cloud: A Survey," International Journal of Advance Science and Technology, Sep. 2020, pp. 4883-4900, 29, 5.

Anonymous, "Getting started with the IBM Cloud Activity Tracker," https://cloud.ibm.com/docs/activity-tracker?topic=activity-tracker-getting-started, Mar. 2021, 10 pages.

Imran, Muhammad, et al., "Provenance based data integrity checking and verification in cloud environments," PloS one. May 2017, 19 pages, 12, 5, e0177576.

Shetty, Sachin, et al., "Data provenance assurance in the cloud using blockchain," Disruptive Technologies in Sensors and Sensor Systems, International Society for Optics and Photonics, May 2017, 12 pages, 10206.

Anonymous, "IBM Cloud offers Caveonix RiskForesight 2.3 to provide visibility into hybrid and multicloud workloads for full-stack understanding of configuration risks at infrastructure, platform, and application levels," IBM United States Software Announcement 220-201, Jul. 2020, 6 pages.

\* cited by examiner

PROVENANCE BASED IDENTIFICATION OF POLICY DEVIATIONS IN CLOUD COMPUTING ENVIRONMENTS

BACKGROUND

The present invention generally relates to distributed computing environments, and more particularly to including hybrid cloud environments.

With the rapid adoption of private, public, hybrid and distributed cloud services, the maintenance and management of data governance and audit trails for the multiple parties concerned in providing such services is of increasing interest. Some of the parties involved in maintenance and management of data governance in cloud computing may include the platform service provider, facilities provider, infrastructure services vendors, network providers, administrators for the operating systems, applications administrators, database administrators, and network administrators. With multiple parties involved in the maintenance and management of a computing environment, there is a possibility of one of those parties performing an action, e.g., unintended action, that can negatively impact the cloud/IT services even outside of their intended roles.

SUMMARY

In accordance with an embodiment of the present invention, a method of detecting policy deviations in computing environments is described that includes creating an immutable ledger of transaction provenance from end to end transactions performed in a distributed computing environment. The method can further include plotting persona data for transaction types from the immutable ledger of transaction as a bipartite graph. In some embodiments, plotting persona data involves provenance data for end to end transactions including personas, systems, and data sources etc. The transactions can be between personas, be between systems, and multiple systems can be part of the end to end transactions. The edge weights of the bipartite graphs are correlated to trust levels between personas from the persona data and the transaction types from the immutable ledger. In some embodiments, the method may continue with correlating trust levels from the edge weights to rules illustrating when the transaction provenance indicates a policy deviation in the distributed computing environment. The rules may then be employed to detect in real time end to end provenance when a policy deviation in the distributed computing environment is occurring. The method may then continue with sending an alert of policy deviations to stakeholders for the distributed computing environment. In some embodiments, a corrective action is performed to correct the policy deviation detected that signaled the sending of the alert.

In another embodiment, a system for detecting policy deviations in distributed computing environments is provided that includes a hardware processor, and a memory that stores a computer program product. The computer program product stored on the memory when executed by the hardware processor, causes the hardware processor to create an immutable ledger of transaction provenance from end to end transactions performed in the distributed computing environment, and plot persona data for transaction types from the immutable ledger of transaction as a bipartite graph. The edge weights of the bipartite graphs are correlated to trust levels between personas from the persona data and the transaction types from the immutable ledger. The system can also correlate trust levels from the edge weights to rules illustrating when the transaction provenance indicates a policy deviation in the distributed computing environment; and employ the rules to detect in real time end to end provenance when a policy deviation in the distributed computing environment is occurring. The system can also send an alert of policy deviations to stakeholders for the distributed computing environment.

In yet another embodiment, a computer program product is provided for detecting policy deviations in distributed computing environments. The computer program product includes a computer readable storage medium having computer readable program code embodied therewith. The program instructions executable by a processor to cause the processor to create, using the processor, an immutable ledger of transaction provenance from end to end transactions performed in the distributed computing environment; and plot, using the processor, persona data for transaction types from the immutable ledger of transaction as an bipartite graph. The edge weights of the bipartite graphs are correlated to trust levels between personas from the persona data and the transaction types from the immutable ledger. The program instructions can also correlate, using the processor, trust levels from the edge weights to rules illustrating when the transaction provenance indicate a policy deviation in the distributed computing environment; and employ, using the processor, the rules to detect in real time end to end provenance when a policy deviation in the distributed computing environment is occurring. In some embodiments, the program instructions may also send, using the processor, an alert of policy deviations to stakeholders for the distributed computing environment.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
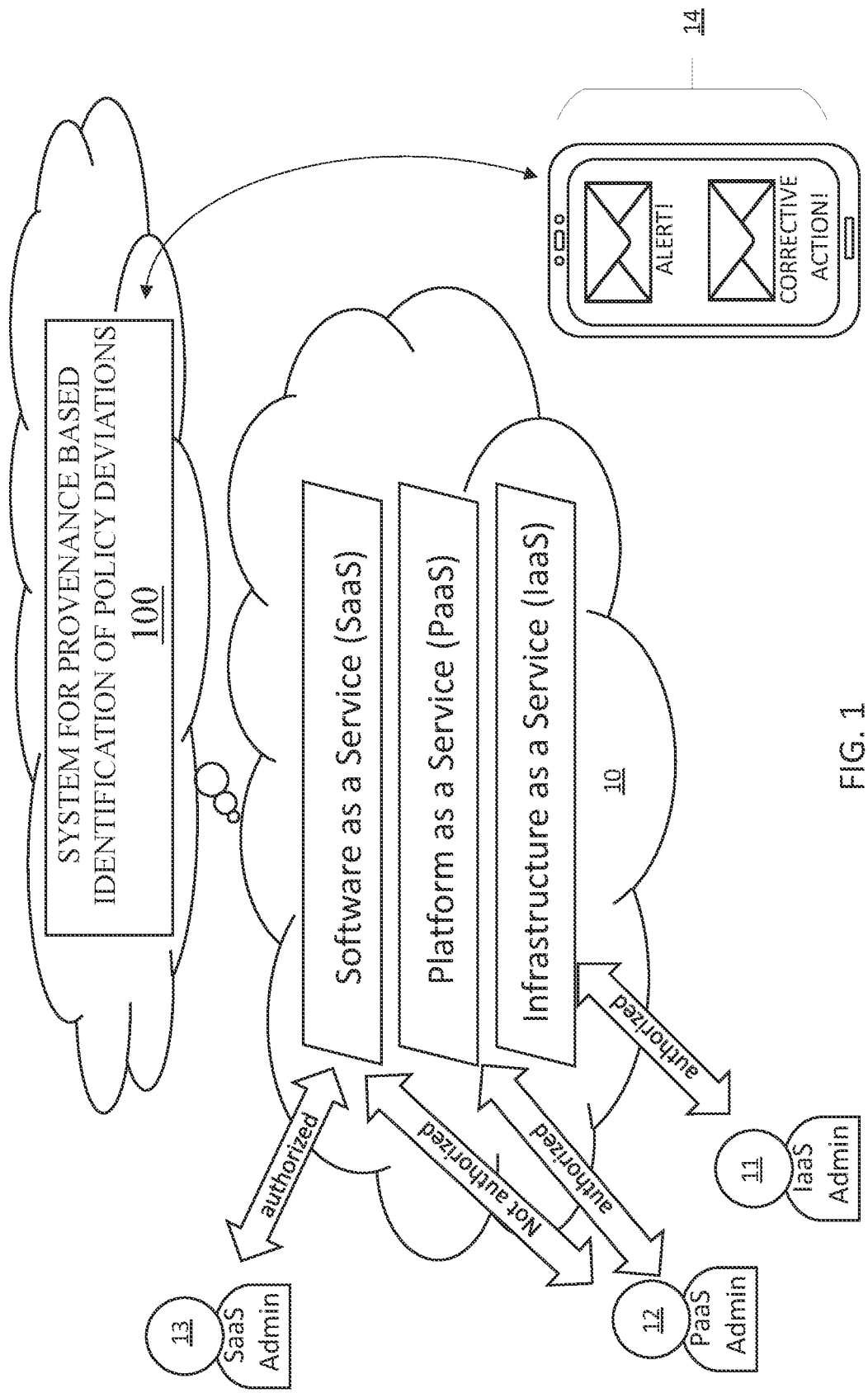
FIG. 1 is a diagram illustrating an exemplary environment, where a system provides for provenance based identification of policy deviations in distributed computing environments, such as cloud computing environments, in accordance with one embodiment of the present disclosure.

The methods, systems and computer program products described herein are directed to distributed computing environments. Distributed computing environments include systems that have components on different networks. Distributed computing environments include cloud computing environments, such as hybrid cloud platforms. Hybrid cloud platforms include a form of cloud computing—or multi-cloud computing—that provides computer system resources in a single environment that can include both public and/or private cloud environments. Cloud computing can include the on-demand availability of computer system resources, especially data storage and computing power, without direct active management by the user. In some examples, the term is generally used to describe data centers available to many users over the Internet. A hybrid cloud platform takes that a step further, operating across two or more of these environments.

The maintenance and management of data governance and audit trails for the multiple parties concerned in providing such services is of increasing interest for cloud computing platforms, such as cloud computing in the hybrid cloud environment. Some of the parties involved in maintenance and management of data governance in cloud computing may include the platform service provider, facilities provider, infrastructure services vendors, network providers, administrators for the operating systems, applications administrators, database administrators, and network administrators. The aforementioned parties may be collectively referred to as "personas". This list is provided for illustrative purposes only, and is not an exhaustive list. For the methods, systems and computer program products described herein, any user and/or administrator of an element of the cloud system having the ability to impact change on the cloud environment is applicable to the methods described herein. With multiple parties involved in the maintenance and management of a cloud environment, there is a possibility of one of those parties performing an action, e.g., unintended action, that can negatively impact the cloud services.

This can lead to unintended consequences, e.g., undesirable access to/of data that poses a threat to data security and integrity. It has been determined, that Identity and Access Management (IAM) tools with artificial intelligence (AI) capabilities do not address this problem adequately. Not tracking a transaction through the entirety of its lifecycle, and not considering dependent nodes/elements in the end-to-end data processing path leaves multiple gaps in data security and potential for lapses in data integrity, and may allow intruders to perform malicious actions with or without being detected.

In some embodiments, in an effort to reduce or substantially eliminate the aforementioned discovered deficiencies, the methods, systems and computer program products can identify the provenance of every transaction and map the interrelated transactions to capture an end to end record of the transaction's lifecycle. As will be described herein, this provides an ability to perform correlation of tasks and activities based on the transaction provenance, the associated roles/responsibilities of personas and the nature of the transactions performed by the personas so as to dynamically identify the actions, violations of the persona's defined spaces and flag deviations. The correlation of tasks and activities can also include time based access to a particular data source or action on a system based on a changed record that was created and/or approved in the system. "Cloud data provenance" is metadata that records the history of the creation and operations performed on a cloud data object. Secure data provenance can provide for data accountability, forensics and privacy. The methods, systems and computer program products that provide for the correlations of tasks and activities based on transaction provenance can facilitate an early detection of malicious activity and internal/external threats, and can generate alerts and provide recommendations to close such gaps. The methods, systems and computer program products of the present disclosure are now described with greater detail with reference to FIGS. 1-7.

Figure 2:
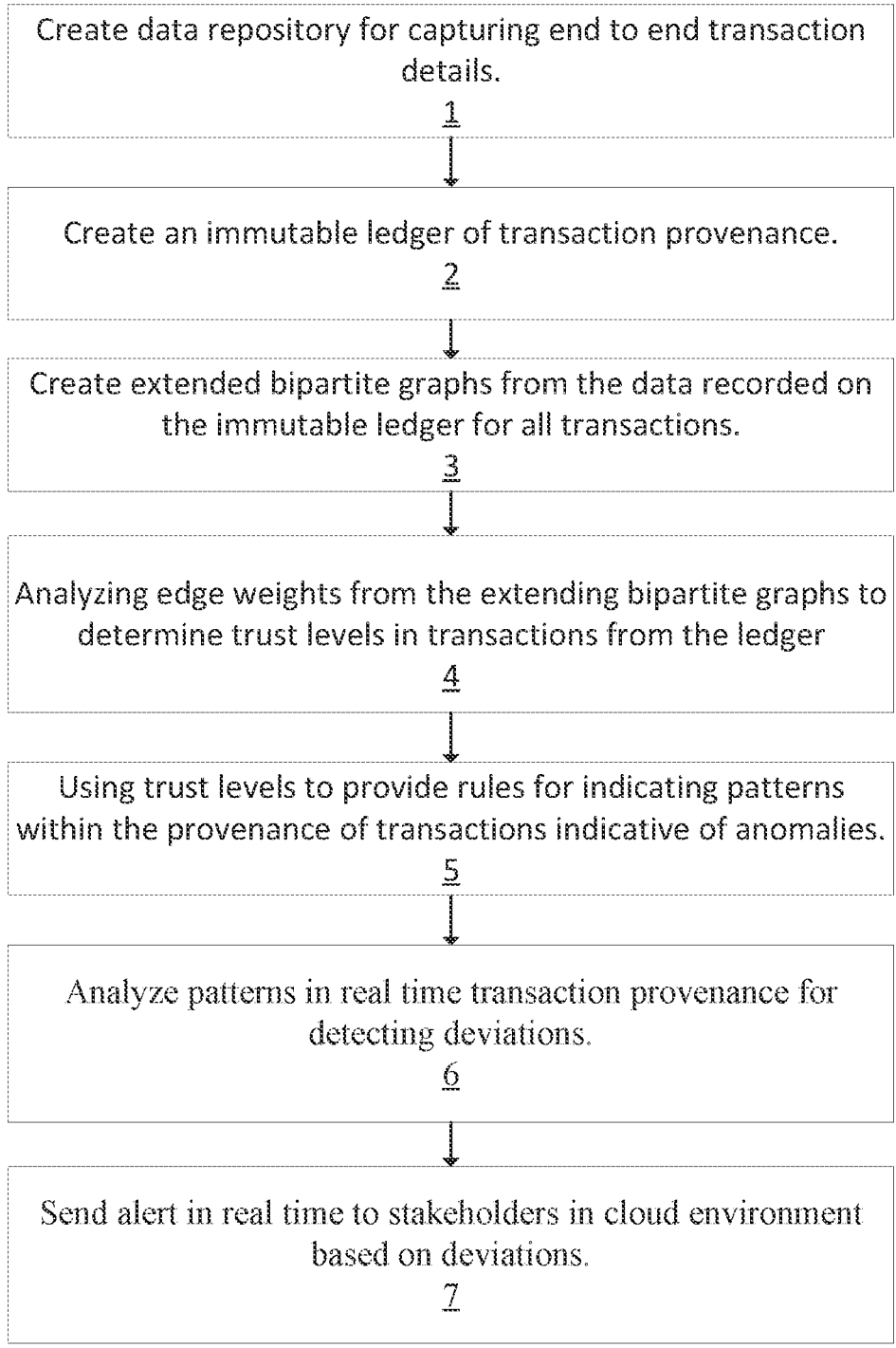
FIG. 2 is a flow chart/block diagram illustrating a method that provides for provenance based identification of policy deviations in distributed computing environments, such as hybrid-cloud environments, in accordance with one embodiment of the present disclosure.
Figure 3:
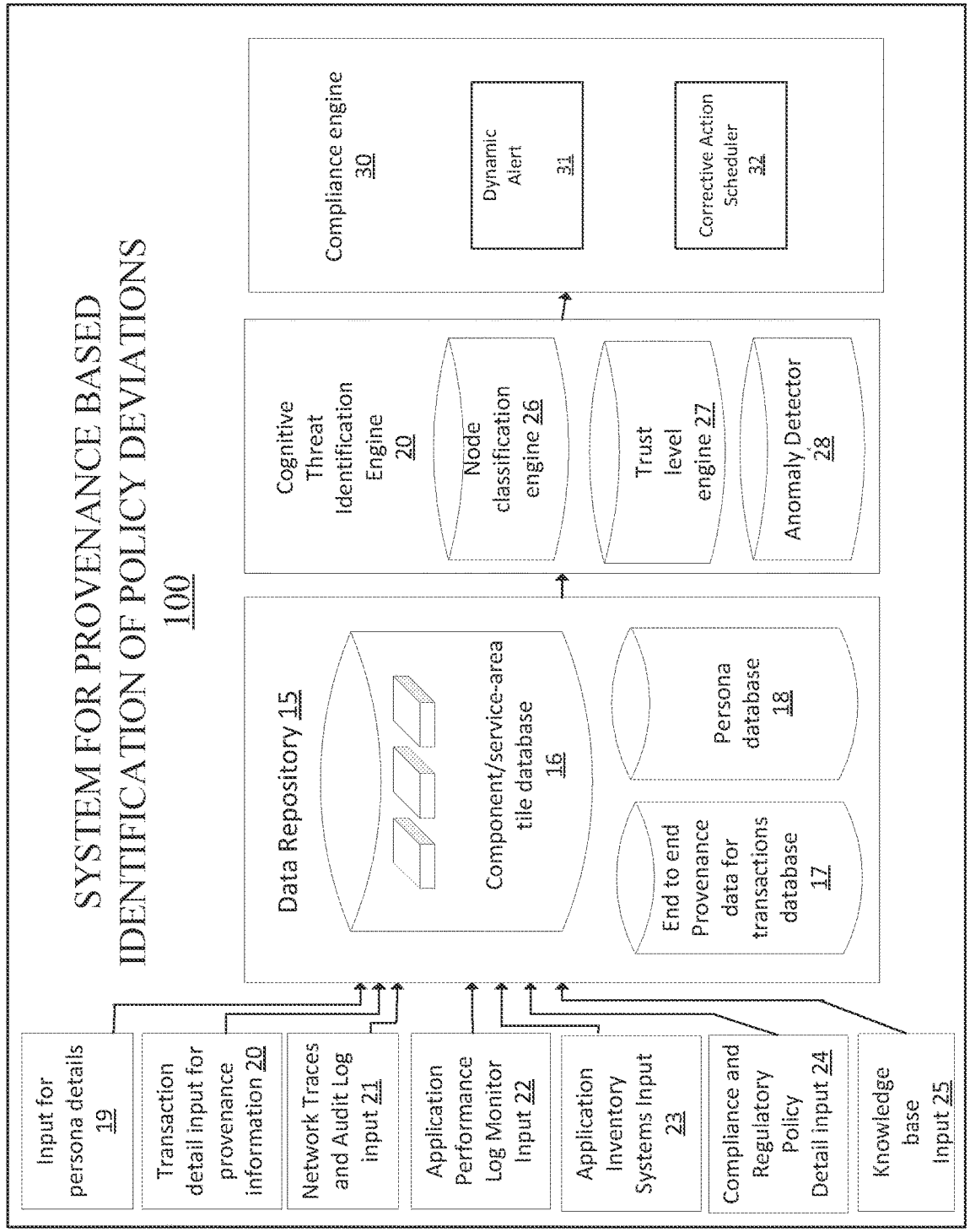
FIG. 3 is a block diagram illustrating a system that provides for provenance based identification of policy deviations in distributed computing environments, such as hybrid-cloud environments, in accordance with one embodiment of the present disclosure.

FIG. 1 an exemplary environment, where a system provides for provenance based identification of policy deviations in cloud environments, e.g., hybrid cloud environments. FIG. 2 illustrates one embodiment of a method that provides for provenance based identification of policy deviations in cloud environments, e.g., hybrid-cloud environments. FIG. 3 illustrates one embodiment of a system that provides for provenance based identification of policy deviations in cloud environments, e.g., hybrid-cloud environments, which in some embodiments may be employed with the method described in FIG. 2.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In hybrid cloud environments, multiple parties may be involved in delivering infrastructure services to businesses. Prior to the methods, systems and computer program products described herein in can be difficult to monitor, track and act upon malicious and erroneous actions of personas/roles in a timely fashion. FIG. 1 illustrates one example of a cloud computing environment 10, and personas, i.e., users of the cloud computing environment conducting transactions ("authorized" and "not authorized"), with the cloud computing environment 10 that is being monitored by the system 100 that provides for provenance based identification of policy deviations in cloud environments. Each of the personas have a list of "assigned responsibilities" and/or "privileges" associated with an element of the distributed computing system. For example, specific "personas" may have assigned responsibilities and privileges for modifying an element on one of the levels of a cloud environments, such as a software as a service (SaaS), infrastructure as a service (IaaS), and platform as a service (PaaS). In the example depicted in FIG. 1, three personas are depicted, e.g., an administrator for Infrastructure as a Service (IaaS) level of a cloud computing architecture (IaaS admin 11), an administrator for the platform as a service (PaaS) level of a cloud computing architecture (PaaS admin 12), and an administrator for Software as a Service (Saas) of a cloud computing architecture (SaaS admin 13). The IaaS admin 11 has assigned responsibilities and privileges for transactions with the IaaS layer of the cloud architecture 10. The PaaS admin 12 has assigned responsibilities and privileges for transactions with the PaaS layer of the cloud architecture 10. The SaaS admin 13 has assigned responsibilities and privileges for transactions with the SaaS layer of the cloud architecture 10. Actions taken by the personas within their assigned responsibilities and/or privileges are "authorized".

For example, as illustrated, the IaaS admin 11 conducting transactions with the IaaS layer of the cloud computing environment 10 is an authorized transaction, and the SaaS admin 13 is conducting transactions with the SaaS layer of the cloud computing environment 10 that is an authorized transaction. However, while the PaaS admin 12 is conducting transactions with the PaaS layer of the cloud computing environment 10 that are within this assigned responsibilities and privileges, which are authorized; in this example, the PaaS admin 12 is also conducting transactions outside his assigned responsibilities and/or privileges with the SaaS layer that are not authorized.

In the example depicted in FIG. 1, in accordance with the methods, systems and computer program products of the present disclosure, the unauthorized transactions by the PaaS admin would be detected by the system 100 that provides for provenance based identification of policy deviations in cloud environments, e.g., hybrid cloud environments. The policy deviation is a persona that is operating outside their responsibilities and privileges in transactions with the distributed computing environment, e.g., a cloud computing environment, such as a hybrid cloud computing environment. Once detected, the policy deviation is reported to stakeholders 14 in the distributed cloud computing environment. A stakeholder may be a platform service provider, facilities provider, infrastructure services vendors, network providers, administrators for the operating systems, applications administrators, database administrators, and network administrators. The aforementioned parties may be collectively referred to as "stakeholders". This list is provided for illustrative purposes only, and is not an exhaustive list. The stakeholder can merely be a party that is responsible for the health and maintenance of the cloud computing environment, or only a portion or element of the cloud computing environment. The alert may be in the form of an electronic mail message or a text message. In some embodiments, in addition to the alert, the system 100 may also provide a corrective action. For example, in the event a change is made to an element of the cloud computing environment that is performed by a persona outside of their privileges and/or responsibilities, the system 100 can reverse the changes performed by the unauthorized transaction by reverting to a previously saved, e.g., backup, setting that the cloud computing environment 10 was operating under prior to the unauthorized change.

In one example, a database administrator (admin) has access to the database of a backup solution. The database admin does not need to look at the backup report or specific details of a backup or data which is available in the database using a query. If the database admin was to take actions to view a backup report, it would be considered a policy deviation. The database administrator may be able to query the database at times when there is an incident or change record in ITSM system for issues with the database. In this example, the database administrator should not be conducting long queries and spending time analyzing the data in the database, that could be a potential policy deviation.

In some embodiments, the methods and systems described herein, consistent with the embodiments described in FIGS. 2 and 3, can maintain an un-editable audit trail and provenance information of all activities, i.e., transactions with the distributed computing systems by the personas, that facilitates an early detection of unintended actions and threats to the underlying data. In some embodiments, the methods and systems provide a write once read many (WORM) ledger. WORM (write once, read many) is a data storage technology that allows information to be written to a form of memory storage and prevents from erasing the data. A "ledger" is a type of database that is shared, replicated, and synchronized among the members of a network. The ledger records the transactions, such as the exchange of assets or data, among the participants in the network.

In some embodiments, a WORM ledger captures all the activities, their provenance, associated hops (transfers between different networks, e.g., different clouds), personas, and roles involved needs to be created with the right data model. The WORM ledge can enable a business to effectively monitor and manage the activities associated with the data, identify malicious behavior, and take preventive and remedial actions to arrest the damage and stage recovery.

The systems, methods and computer program products can use transaction provenance data to detect deviations from approved paths and identify malicious transactions in the end-to-end transaction path. The system, methods and computer program products can calculate edge weights, which represent trust levels, for the end to end transaction to establish the baseline and help to identify deviations/anomalous transactions using machine learning. Further, bipartite graphical representation of transaction provenance are provided using edge weights. In some embodiments, using the graphical representations, the methods, systems and computer program products can analyze anomalies and deviations from the pattern comparisons. In one embodiment, this can include computing a trust level for a transaction flow based on calculated weights. This can include using assigned activity weights of different transactions, time of the day, actor (who/identity) performing the activity, frequency of activities and time taken to complete the activity, etc. In some embodiments computing the trust level includes analyzing the trust levels/weights in real-time and identifying malicious activity based on deviation in weights (based on thresholds). In some embodiments, computing the trust level also includes historical data that is used to detect patterns and other attributes of the transaction.

Further, correlative analytics utilizing transaction characteristics (i.e. provenance data, source, target, persona, policy information, direction of flow, location, time of transaction etc.) can be employed to detect deviations in real-time across complete infrastructure landscape, e.g., across any of public cloud, private cloud, hybrid cloud and on-premise networks.

Referring to FIG. 2, in some embodiments, the method may begin with creating a data repository 15 for capturing end to end transaction details including all activities, performing roles/personas, details of associated applications/systems or nodes, time of the day etc. Block 1 of FIG. 2 includes creating a data repository 15 for capturing end to end transaction details. The data repository 15 is one component of the system 100 that provides for provenance based identification of policy deviations that is depicted in FIG. 3. The data repository 15 may include a component/service-area tiles database 16, an end to end provenance data for transactions database 17 and a persona database 18. Each of the aforementioned databases may include memory storage, which could be a form of cloud storage. Cloud storage is a model of computer data storage in which the digital data is stored in logical pools, said to be on "the cloud". The physical storage spans multiple servers (sometimes in multiple locations), and the physical environment is typically owned and managed by a hosting company. In some instances, physical storage may be provided through hardware such as a hard disk, solid state drive, a random access memory (RAM), a read-only memory (ROM), an erasable programmable read-only memory (EPROM or Flash memory), a static random access memory (SRAM).

In one embodiment, the component/Service-Area tiles database 16 includes nodes/elements of characteristics information on various regulatory requirements and current compliance postures/states. A tiles database includes tiles that are used to divide the data into smaller, manageable areas that are stored in the database.

Referring to FIG. 2, in some embodiments, creating a data repository 15 for capturing end to end transaction details at block 1 may include capturing all activities, performing roles/personas, details of associated applications/systems or nodes, time of the day etc. in a cloud setting, e.g., hybrid cloud setting. In one example, to build the data repositor 15, the method can employ network traces, audit logs/traces, application performance logs, compliance and regulatory posture details etc. in the hybrid cloud settings. In some embodiments, the audit logs/traces are from different tools used in the enterprise and cloud specific customer infrastructure.

Referring to FIG. 3, in some embodiments, the data repository 15 may include a plurality of inputs. For example, the inputs to the data repository 15 can include a real time data feed for persona details (persona detail input 19). The persona detail input include the identity of a person that is interacting with the cloud environment, as well as their function. The function can include characterization as a user, administrator, maintenance, management etc. The term "real time" denotes that the system 100 may be receiving this information concurrently with each interaction by a party with the cloud environment. The data from the transaction detail input for personal detail input 19 may be stored in the persona database 18.

The inputs for the data repository 15 can also include an input for transaction details for provenance information (also referred to as transaction detail input for provenance information 20). Data provenance alludes to record of the information sources, elements, frameworks and procedures that impact data of interest, giving a chronicled record of the date and its birthplace. Cloud computing can separate the administrative models into various classifications, e.g., Infrastructure as a Service (IaaS), Platform as a Service (PaaS) and Software as a Service (SaaS). Cloud applications are sent after these layers are created, and IaaS is at the base, PaaS is at that center, and SaaS is at the top. The layered methodology can also incorporate levels, such as virtualization, equipment and customer apparatuses. Logical and business applications are created, sent, and executed utilizing at least one of the administrative models offered in the cloud. Different segments of cloud mindful applications live on different layers of the cloud. Contingent upon the layered design, the asset suppliers are keen on the IAAS layer of the cloud which underpins virtualization of assets to empower computation, stockpiling, and correspondence. These assets, frequently names as SaaS, are used by cloud applications, for example, email service and sharing documents. The PaaS layer is utilized by developers to alter and effectively create, send and oversee cloud mindful applications so to top off the hole among IaaS and SaaS.

Each layer of the cloud has its own provenance. Considering the different layers of cloud computing, asset suppliers are essentially inspired by the foundation provenance to confirm the use of assets. For instance, to produce reports of memory and CPU utilization from a specific bunch over some stretch of time. The designers of cloud mindful applications are keen on the exhibition of the sent application and the check of logical tests for investigation reasons. The provenance of capacity layer is used by clients for the information respectability checks and confirmation. The amassed provenance from the different layers of a cloud provides a view of misuses within the cloud, e.g., misuses amongst the different cloud layers including misuses in the connections of the layers. Similar to the personal detail input 19, the transaction detail input for provenance information 20 may be received by the system in real time. The data from the transaction detail input for provenance information 20 may be stored in end to end provenance data for transactions database 17.

Referring to FIG. 3, in some embodiments, the data input (for the data repository also include network traces and audit logs. A "network trace" may capture actions directly by the user on behalf of the user by a service provider ion the cloud. The network trace can also capture actions by a system that was enabled by the user. For example, users can enable systems to do malicious activities.

An "audit log", which can also be referred to as an admin activity audit logs, can contain log entries for API calls or other actions that modify the configuration or metadata of resources. For example, these logs record when users create virtual machine (VM) instances or change identity and access management permissions.

Referring to FIG. 3, in some embodiments, another real time data feed into the system 100 may be provided by an application performance monitoring log (application monitoring input 22). In some embodiments, application monitoring provides data indicative of when a line of business apps, or their related databases, email system, etcetera, is not performing properly. In some embodiments, the data from the application monitoring input 22 can be stored in the component/service-area tiles database 16. In some other embodiments, the data from the application monitoring input 22 can also be stored in the an end to end provenance data for transactions database 17.

Other data feeds can include an application inventory systems input 23, a compliance and regulatory policy detail input 24, and a knowledge base input 25. The application inventory systems input 23 may provide application inventory and mapping data, and the data received therefrom may be stored in the component/service-area tile database 16. The data from the compliance and regulatory policy detail input 24 may similarly be stored in the component/service-area tile database 16. The knowledge base input 25 can include internet data, media articles, regulatory information, etc., and the data received from the knowledge base input 25 may also be stored in the component/service-area tile database 16.

Referring back to FIG. 2, following the formation of the data repository 15, the method may include creating an immutable ledger of transaction provenance at block 2. The immutable ledger can be a part of the data repository 15, or it can exist as a separate component. In some embodiments, all of the data that comes to the repository can go to the immutable ledges after analysis. The immutable ledger of transaction provenance may be stored in the end to end provenance data for transactions database 17 module of the data repository 15. By "immutable" it is meant that it is not changed to remove the history of provenance. In some embodiments, the immutable ledger of transaction provenance at block 2 is provided in a form of block chain provenance memory. In some instances, data provenance should adhere to security policies to be reliable and trustworthy. In some example, the data provenance does not reveal any data indicating the original data, and the data provenance can be stored in an encrypted format to prevent privacy issues. Because the ledger of transaction provenance is immutable, the provenance data is immune to unauthorized changes in both the storage and during transmission. Additionally, the immutable ledger of transaction provenance can also be immune to forgery. The provenance data is linked to the source data, e.g., the data from the data repository 15, and cannot be forced without notice.

In some embodiments, to provide that the ledger is immutable blockchain memory is applied. The block chain is organized a circulated open record where any single exchange is seen and verified by arranging hubs. Block chain's decentralized engineering can be utilized to build up a substantially guaranteed provenance administration for cloud computing environments. With block chain-based data provenance administration, all data activities are straightforward and can be potentially forever recorded, i.e., recorded for as long as the cloud computing environment is in service.

Figure 4:
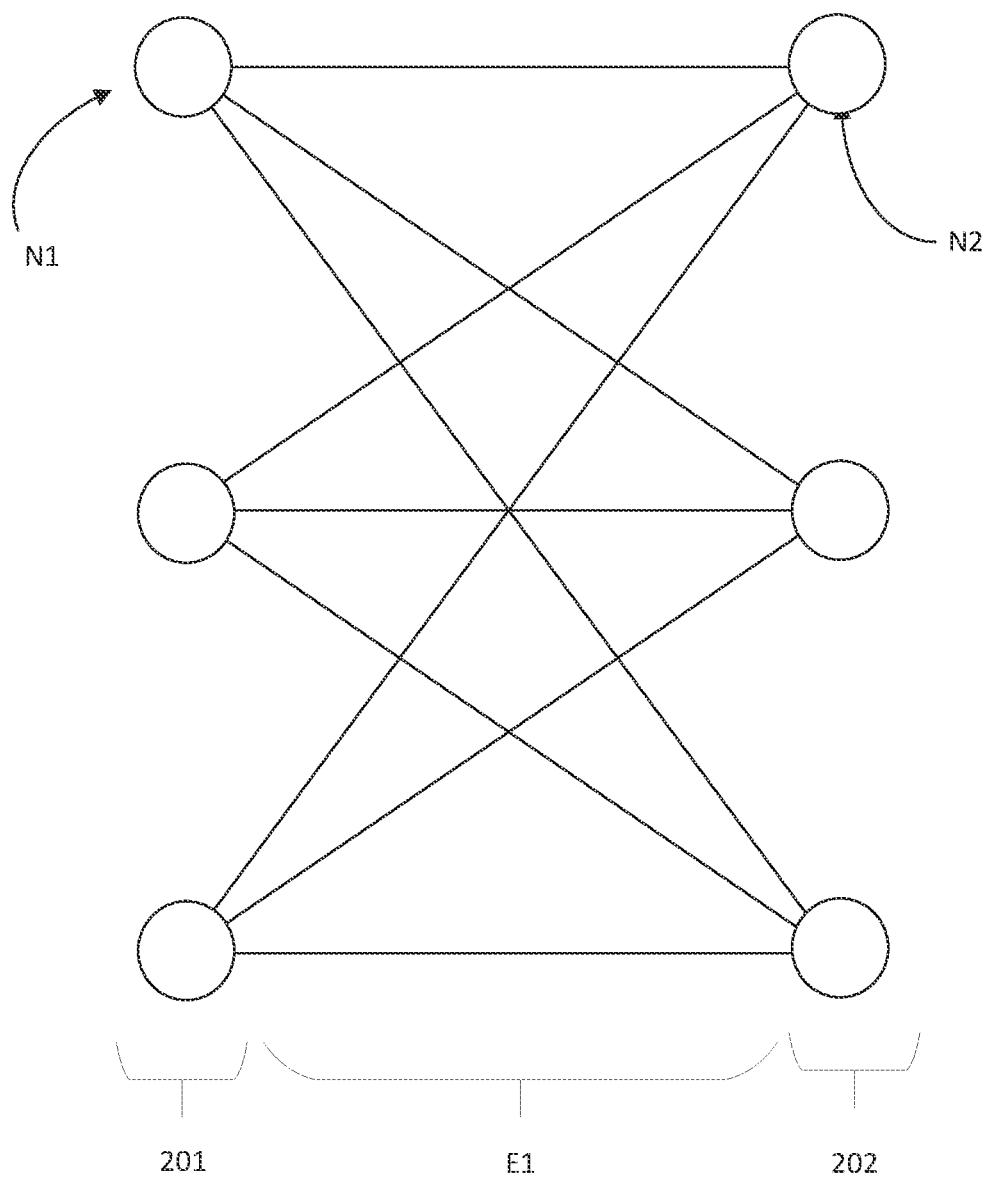
FIG. 4 is a graph illustrating one example of an extended bipartite graph of provenance data in which the edge weights of the graph indicate trust levels in end to end transactions, in accordance with one embodiment of the present disclosure.

Referring back to FIG. 2, the method may continue with creating extended bipartite graphs from the data recorded on the immutable ledger for all transactions at block 3. The extended bipartite graphs are formulated from the immutable ledger of transaction provenance produced at block 2. FIG. 4 illustrates one example of an extended bipartite graph 200. The model depicted in FIG. 4 here can have edge among nodes on the same side. Referring to FIGS. 2 and 4, the left side 201 of the extended bipartite graph 200 represents the multiple parties/personas/roles; the edges E1 between these parties/personas/roles/groups show their relationships; and the right side 202 right side represents the data sources or cloud/infra resources. The configuration and relationship changes between the nodes in the infrastructure landscape will be reflected in the graph dynamically. An edge E1 denotes an activity performed by a party on a data/resource. The nodes N1, N2 (data points on each side 201, 202 of the graph 200) can have labels such as role, location, group info, access permissions, related application info, average frequency of various type of operation, the time taken for various types of operations, and compliance/regulatory parameters etc. Right side nodes N2 can also have edges among them showing their dependencies/relationships. Edges E1 between nodes N1, N2 from left to right show the relationship between them. In some embodiments, there can be multiple edges between the same nodes N1, N2 from left to right 201, 202 for different operations such as read, write, modify, special application related operations etc. The weight of the edge is of different value depending on the type of operation. The edge weight represents the trust level on the activities. The trust value is predefined at activity level and computed at the transaction level. The transaction at the transaction level represents end to end activities. The end to end activities include the provenance. So in some embodiments, the trust level that is determined through the extended bipartite graphs 200 adds a level to the provenance of what transactions are appropriate for the cloud computing environment, and what transactions are not appropriate for the cloud computing level. In some embodiments, the graphs may be time series based graphs representing different types of operation at various times.

Referring to FIG. 3, in some embodiments, the step of creating the extended bipartite maps 200 may be provided by a cognitive threat identification engine 20. The cognitive threat identification engine 20 can employ artificial intelligence, such as machine learning, to create the extended bipartite maps from the data recorded on the immutable ledger for all transactions at block 3 of FIG. 2, and calculate trust levels from the edges of the bipartite maps. The artificial intelligence may include a neural network. In some embodiments, the artificial intelligence includes machine learning. "Machine learning" is a method of data analysis that automates analytical model building. It is a branch of artificial intelligence based on systems learning from data, identifying patterns and make decisions with minimal human intervention. Machine learning employs statistical techniques to give computer systems the ability to "learn" (e.g., progressively improve performance on a specific task) with data, without being explicitly programmed. The machine learning method that can be used to create the extended bipartite maps from the data recorded on the immutable ledger for all transactions at block 3 of FIG. 2, and calculate trust levels from the edges of the bipartite maps can include decision tree learning, association rule learning, artificial neural networks, deep learning, inductive logic programming, support vector machines, clustering analysis, bayesian networks, reinforcement learning, representation learning, similarity and metric learning, sparse dictionary learning, genetic algorithms, rule-based machine learning, learning classifier systems, and combinations thereof. The remote predictive light setting computing system using machine learning produces a model for providing predictive light characteristics in response to environmental inputs, such as time, weather and calendar date may include a machine learning algorithm that can be selected from the group consisting of: Almeida-Pineda recurrent backpropagation, ALOPEX, backpropagation, bootstrap aggregating, CN2 algorithm, constructing skill trees, dehaene-changeux model, diffusion map, dominance-based rough set approach, dynamic time warping, error-driven learning, evolutionary multimodal optimization, expectation-maximization algorithm, fastICA, forward-backward algorithm, geneRec, genetic algorithm for rule set production, growing self-organizing map, HEXQ, hyper basis function network, IDistance, K-nearest neighbors algorithm, kernel methods for vector output, kernel principal component analysis, leabra, Linde-Buzo-Gray algorithm, local outlier factor, logic learning machine, LogitBoost, manifold alignment, minimum redundancy feature selection, mixture of experts, multiple kernel learning, non-negative matrix factorization, online machine learning, out-of-bag error, prefrontal cortex basal ganglia working memory, PVLV, Q-learning, quadratic unconstrained binary optimization, query-level feature, quickprop, radial basis function network, randomized weighted majority algorithm, reinforcement learning, repeated incremental pruning to produce error reduction (RIPPER), Rprop, rule-based machine learning, skill chaining, sparse PCA, state-action-reward-state-action, stochastic gradient descent, structured kNN, T-distributed stochastic neighbor embedding, temporal difference learning, wake-sleep algorithm, weighted majority algorithm (machine learning) and combinations thereof.

In other embodiments, there can be a separate bipartite graph creator within the threat identification engine block. Machine learning can be leveraged for this. However, machine learning may be more appropriate for value addition in identifying the deviation based on various attributes associated to the labels of node involved in the graph and type of transactions and associated historical data. Trust levels can be predefined. Also trust levels can be dynamically derived using machine learning methods as well. Changes in enterprise policies, regulations can be fed back to these machine learning systems through natural language processing systems and accordingly existing scores can be changed or fine-tuned according to the context.

It is noted that the cognitive threat identification engine 20 may be employed to employ one of the aforementioned machine learning methods and/or machine learning algorithms to create the extended bipartite maps from the data recorded on the immutable ledger for all transactions at block 3 of FIG. 2, and calculate trust levels from the edges of the bipartite maps. The cognitive threat identification engine 20 may include at least one form of physical memory for storing instructions for executing a machine learning process using at least one hardware processor for providing the model for providing predictive light characteristics in response to environmental inputs.

The cognitive threat identification engine 20 may include an node classification engine 21, which may include memory storing a set of instructions to be executed by a hardware processor, for performing node classification of the nodes N1, N2 for the left and right 201, 202 sides of the extended bipartite graph 200. In some embodiments, the node classification engine 21 can create/update dependencies and relation maps, and can run supervised learning on nodes and their dependencies in parallel. By supervised learning, it is meant that machine learning can determine from the immutable ledger of transaction provenance produced at block 2 what information can be used to provide node information, for the classification of the nodes N1, N2 of the extended bipartite graphs 200. Running supervised learning in parallel can help to identify relationships between different systems, and can help to facilitate edge weight calculations from the data including the data in the repository/immutable ledger.

Still referring to FIG. 3, the cognitive threat identification engine 20 may include a trust level engine 22. The trust level engine 22 may provide for supervised learning and an edge weight/trust factor calculation. The trust level engine 22 can compute a trust level of the transaction flow based on calculated weights. For example, the trust level of a transaction flow can be computed using assigned activity weights, time of the day, actor performing the activity, frequency of activities etc.

The cognitive threat identification engine 20 also includes an anomaly detector 28. The anomaly detector 28 can analyze the trust levels/weights in real-time and can identify malicious activity based on deviation in weights. The anomaly detector 28 can identify deviations from pattern comparisons with the help of learning system using graph-based anomaly detection mechanism. Various transaction and access behaviors are learned using the calculated weights. Anomalies/deviations are identified when a certain weight deviates from a normal weight, or node labels/attributes don't match with historical pattern. Activities between personas and/or resources that do not have direct relationship in the context of the transaction will be identified and flagged.

In some embodiments, edge weights of the bipartite graphs are correlated to trust levels between personas from the persona data and the transaction types from the immutable ledger. However, correlating trust levels is only one option. Other options can include identifying deviation from historical patterns based on various attributes (and its variation over time) for different operations and system/personas involved in the end to transaction etc. The role of personas is also a factor, as well as their previous history.

Normal pattern identification can be performed using the calculated weights and trust factors. Learning systems can record various insights and can help to update node labels such as frequency of various operations, high/low usage of systems/resources by different parties at scheduled time periods, etc. kind of various normal BAU patterns and historical insights over a period. Identify deviation from the pattern can be aided by the learning system and graph-based anomaly detection mechanism and historical data of good/bad patterns. Various transaction and access behaviors can be learned using the calculated weights and the anomalies/deviations can be identified when a certain weight is deviated from a normal weight or node labels/attributes don't match the historical reference or sequence of graph pattern don't match with historical pattern. When such deviations occur, stakeholders are alerted for getting go/no-go decisions or the system can take automatic decisions and protect the system from malicious activities.

In some embodiments, the cognitive threat identification engine 20 depends on data repository to create or modify its rules base using natural language processing (NLP) techniques. Natural language processing (NLP) is a subfield of computer science, information engineering, and artificial intelligence concerned with the interactions between computers and human (natural) languages, in particular how to program computers to process and analyze large amounts of natural language data. Natural language processing frequently involves, natural language understanding, and natural language generation. More specifically, using natural language processing (NLP) the node classification engine 21 organizes the content from the data recorded on the immutable ledger. The knowledgebase, e.g., portion of the data repository 15, is continually updated from internal data feeds (documentation related to infra/application, policy/compliance etc.) as well as external sources such as CERT advisories, vendor advisories etc.

Referring to FIG. 2, the method can further include analyzing edge weights from the extending bipartite graphs to determine trust levels in transactions from the ledger at block 5. From analyzing the edge weights using artificial intelligence (AI), e.g., machine learning, the trust level engine 22 of the cognitive threat identification engine 20 can create new rules and/or modify existing rules that are used to determine whether an anomaly has occurred with respect to personal operating in the cloud environment.

In some embodiments, the transaction provenance is recorded as time series graphs to establish a baseline. Patterns are identified using the calculated weights representing trust levels from block 5. In some embodiments, patterns may be provided for trusted normal operations, abnormal but acceptable operations, unacceptable deviations in operations, and/or unacceptable errors by performing actors, etc. The machine learning systems of the cognitive threat engine 20, e.g., the trust level engine 27 of the cognitive threat engine 20, records various insights and helps to update node labels such as frequency of various operations, high/low usage of systems/resources by different parties at scheduled time periods, etc. In some embodiments, the trust level engine 27 can establish business as usual (BAU) patterns and historical insights for pattern comparison purposes.

Referring to FIG. 2, in some embodiments, the method can include analyzing patterns in real time transaction provenance for detecting deviation at block 6. In this example, following the establishment of rules, and/or modification of rules, that employed transaction provenance to determine trends indicative of improper conduct in the cloud computing environment, new transaction provenance is analyzed in view of the rules to detect when improper conduct is occurring. In some embodiments, the anomaly detector 28 of the cognitive threat engine 20 can analyze patterns for detecting deviations. The anomaly detector 28 can identify deviations from pattern comparisons with the help of learning system using graph-based anomaly detection mechanism. Various transaction and access behaviors are learned using the calculated weights. Anomalies/deviations are identified when a certain weight deviates from a normal weight, or node labels/attributes don't match with historical pattern. Anomalies/deviations are identified when a certain weight deviates can also be identified when a certain weight deviates from a predefined threshold, which can include a range of values. For example, activities between personas and/or resources that do not have direct relationship in the context of the transaction will be identified and flagged.

Based on the deviations identified dynamically, alerts and notifications are raised in real-time to all the stakeholders for immediate mitigation actions. As is illustrated in FIG. 1, the alert may be in the form of an electronic mail message or a text message. In some embodiments, in addition to the alert, the system 100 may also provide a corrective action. For example, in the event a change is made to an element of the cloud computing environment that is performed by a persona outside of their privileges and/or responsibilities, the system 100 can reverse the changes performed by the unauthorized transaction by reverting to a previously saved, e.g., backup, setting that the cloud computing environment 10 was operating under prior to the unauthorized change.

In some embodiments, the provenance based threat identification helps to reduce or eliminating multiple insider threats caused by willful or malicious actions of various personas and actors within the system. This in turns translates to lesser high severity incidents and lesser service level agreement (SLA) breaches.

The methods, systems and computer program products that are described herein can be applied to all types of environments i.e. public, private, hybrid cloud environments and on-premise environments where multiple parties are involved in delivering data processing services, to protect data and stage recovery where necessitated. The methods, systems and computer program products that are described herein can provide for early detection of the anomalies based on provenance analysis. Further, in some embodiments, the methods, systems and computer program products that are described herein can enables detection of malicious and erroneous actions in real-time. Automated remedial measures may be orchestrated for certain types of malicious or erroneous actions for damage containment and staging recovery. Creates time-based views of transactions which can be leveraged for other purposes (e.g., operations/schedule planning and resource distribution) along with anomaly detection. Also, activity between resources (or between parties and resources) that are not having relationship will be identified and flagged by the proposed system.

Figure 5:
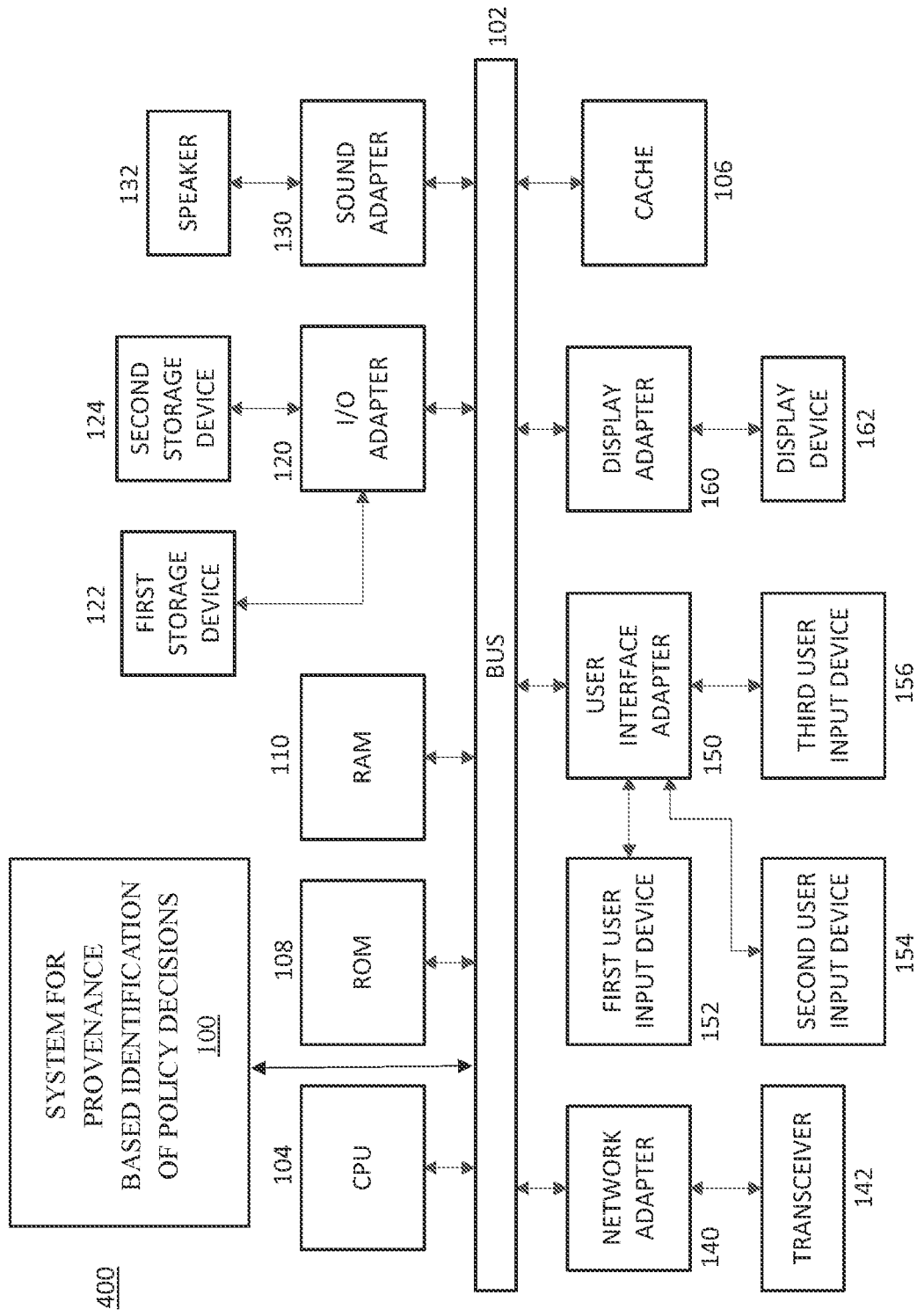
FIG. 5 is a block diagram illustrating a system that can incorporate the system that provides for provenance based identification of policy deviations in hybrid-cloud environments that is depicted in FIG. 3, in accordance with one embodiment of the present disclosure.

FIG. 5 is a block diagram illustrating a process system 400 that can incorporate the system that provides for provenance based identification of policy deviations in hybrid-cloud environments that is depicted in FIG. 3. FIG. 5 depicts one embodiment of an exemplary processing system 400 to which the present invention may be applied is shown in accordance with one embodiment. The processing system 400 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. As illustrated, the system 100 that provides for provenance based identification of policy deviations in cloud environments can be integrated into the processing system 400 by connection to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

The present invention may be a system, a method, and/or a computer program product at any possible technical detail level of integration. For example, in some embodiments, a computer program product is provided for detecting policy deviations in distributed computing environments. The computer program product includes a computer readable storage medium having computer readable program code embodied therewith. The program instructions executable by a processor to cause the processor to create, using the processor, an immutable ledger of transaction provenance from end to end transactions performed in the distributed computing environment; and plot, using the processor, persona data for transaction types from the immutable ledger of transaction as an bipartite graph. The edge weights of the bipartite graphs are correlated to trust levels between personas from the persona data and the transaction types from the immutable ledger. The program instructions can also correlate, using the processor, trust levels from the edge weights to rules illustrating when the transaction provenance indicate a policy deviation in the distributed computing environment; and employ, using the processor, the rules to detect in real time end to end provenance when a policy deviation in the distributed computing environment is occurring. In some embodiments, the program instructions may also send, using the processor, an alert of policy deviations to stakeholders for the distributed computing environment.

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

It is understood that this disclosure includes a detailed description on cloud computing, implementation of the teachings recited herein are not limited to a cloud computing environment. Rather, embodiments of the present invention are capable of being implemented in conjunction with any other type of computing environment now known or later developed.

The methods of the present disclosure may be practiced using a cloud computing environment. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
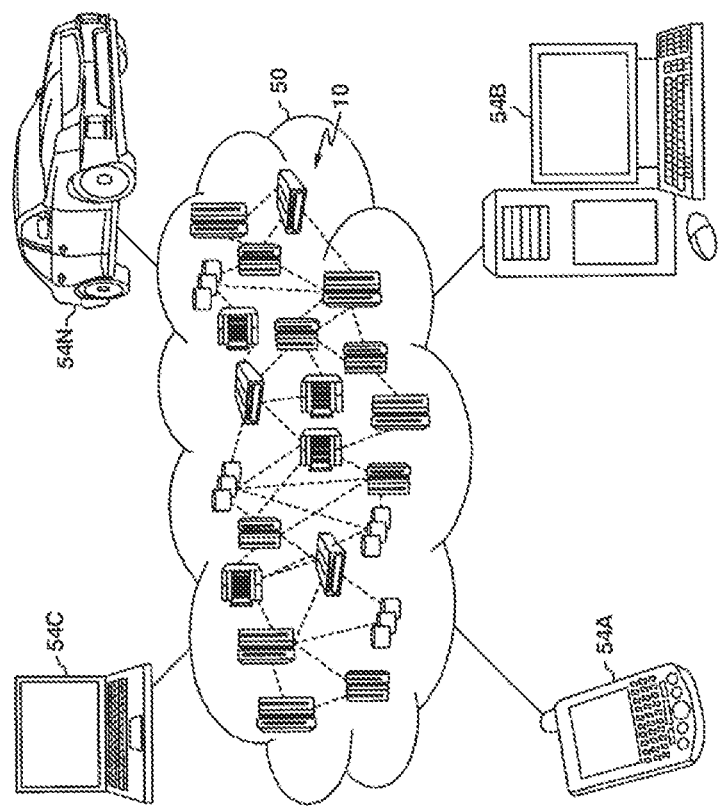
FIG. 6 depicts a cloud computing environment according to an embodiment of the present disclosure.

Referring now to FIG. 6, illustrative cloud computing environment 50 is depicted. As shown, cloud computing environment 50 includes one or more cloud computing nodes 51 with which local computing devices used by cloud consumers, such as, for example, mobile and/or wearable electronic devices 100, desktop computer 54B, laptop computer 54C, and/or automobile computer system 54N may communicate. Nodes 110 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 51 and cloud computing environment 50 can communicate with any type of computerized device over any type of network and/or network addressable connection (e.g., using a web browser).

Figure 7:
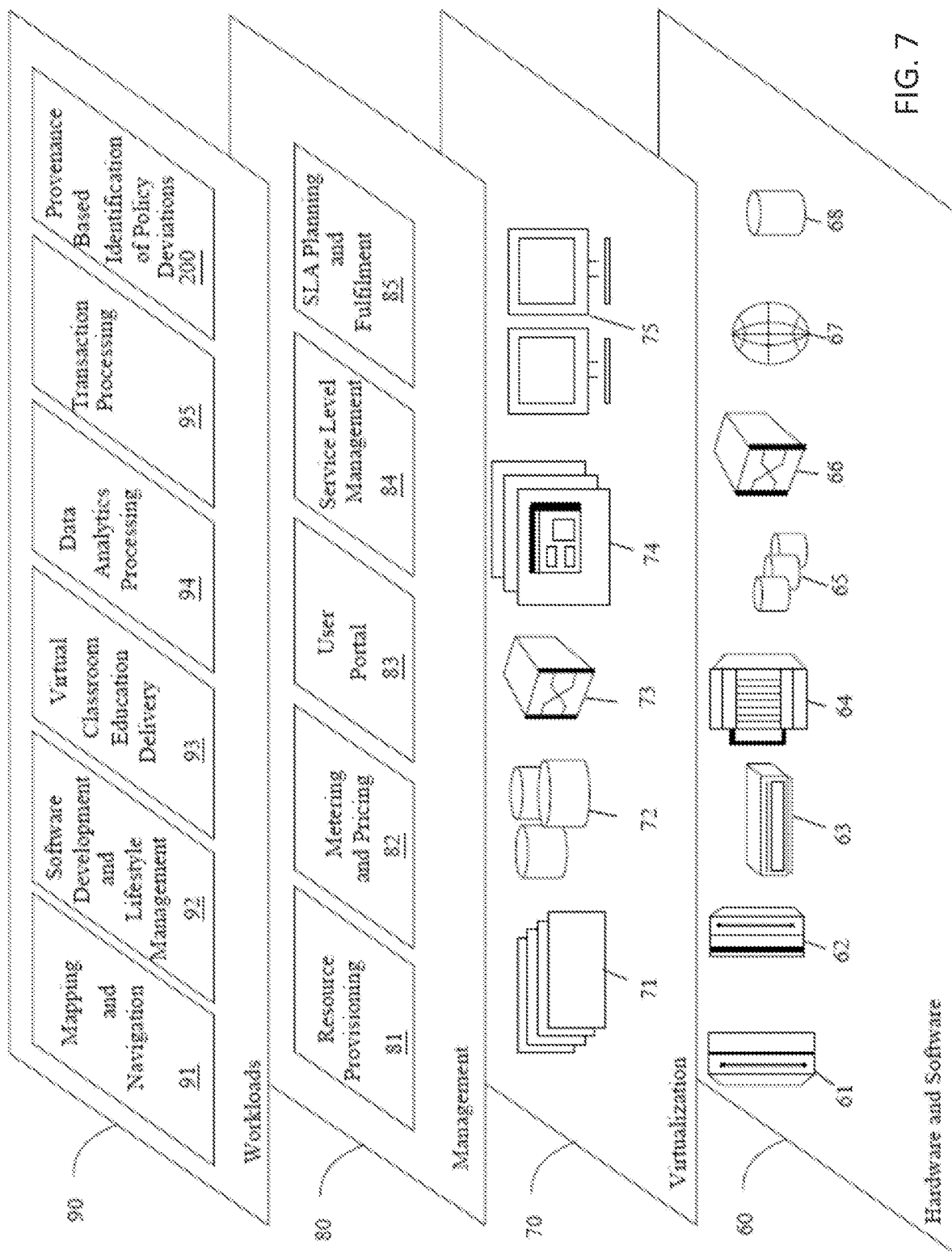
FIG. 7 depicts abstraction model layers according to an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providence based identification of policy deviations 100. The provenance based identification of policy deviations in cloud environments 100 includes the methods and systems described with reference to FIGS. 1-3.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method for provenance based identification of policy deviations in cloud environments (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method of detecting policy deviations in cloud based distributed computing environments comprising:

creating an immutable ledger of transaction provenance performed in the cloud based distributed computing environment;

collecting persona data that includes an identity for an actor working in the cloud computing environment, and a list of authorized transactions for the identity, the list of authorized transactions indicating a level of the cloud based distributed computing environment that the identity is authorized to modify;

plotting persona data for transaction types from the immutable ledger of transaction as an bipartite graph, wherein edge weights of the bipartite graphs are correlated to trust levels between personas from the persona data and the transaction types from the immutable ledger;

employing rules to detect in real time when a policy deviation in the cloud based distributed computing environment is occurring;

correlating trust levels from the edge weights to the rules illustrating when the transaction provenance indicates the policy deviation in the cloud based distributed computing environment, wherein the policy deviation is indicative of an unauthorized change to infrastructure of the distributed computing environment based on the identity included in the persona data of the actor; and performing a corrective action to revert the change to the infrastructure in the cloud based distributed computing environment that triggered the policy deviation being detected by the rules.

2. The computer-implemented method of claim 1, wherein the immutable ledger of transaction provenance comprises block chain memory.

3. The computer-implemented method of claim 1 further comprising creating a data repository including a database of cloud components, a persona database and a database for historical transactions, wherein the data repository provides the data for creating the immutable ledger of transaction provenance.

4. The computer-implemented method of claim 1, wherein the transaction types indicate what modifications are made the cloud computing environment made by the identity for the persona data.

5. The computer-implemented method of claim 1, wherein the edge weights of the bipartite graphs are correlated to the trust levels comprise high trust levels when the provenance indicates personas operating within their assigned responsibilities and low trust levels when the person personas are operating outside their assigned responsibilities.

6. The computer implemented method of claim 1, wherein the policy deviation indicates that the actor corresponding to the identity included in the persona data has made a modification to an element of the distributed computing element outside their list of authorized transaction types.

7. A system for detecting policy deviations in cloud based distributed computing environments comprising:
   a hardware processor; and
   a memory that stores a computer program product, which when executed by the hardware processor, causes the hardware processor to:
   create an immutable ledger of transaction provenance performed in the cloud based distributed computing environment;
   collect persona data that includes an identity for an actor working in the cloud computing environment, and a list of authorized transactions for the identity, the list of authorized transactions indicating a level of the cloud based distributed computing environment that the identity is authorized to modify;
   plot persona data for transaction types from the immutable ledger of transaction as an bipartite graph, wherein edge weights of the bipartite graphs are correlated to trust levels between personas from the persona data and the transaction types from the immutable ledger;
   employ the rules to detect in real time when a policy deviation in the cloud based distributed computing environment is occurring;
   correlate trust levels from the edge weights to rules illustrating when the transaction provenance indicate a policy deviation in the cloud based distributed computing environment, wherein the policy deviation is indicative of an unauthorized change to infrastructure of the distributed computing environment; and
   perform a corrective action to revert the change to the infrastructure in the cloud based distributed computing environment that triggered the policy deviation being detected by the rules.

8. The system of claim 7, wherein the immutable ledger of transaction provenance comprises block chain memory.

9. The system of claim 8 further comprising creating a data repository including a database of cloud components, a persona database and a database for for historical transactions, wherein the data repository provides the data for creating the immutable ledger of transaction provenance.

10. The system of claim 7, wherein the transaction types indicate what modifications made on a level of the cloud computing environment made by the identity for the persona data.

11. The system of claim 7, wherein the edge weights of the bipartite graphs are correlated to the trust levels comprise high trust levels when the provenance indicates personas operating within their assigned responsibilities and low trust levels when the person personas are operating outside their assigned responsibilities.

12. The system of claim 7, wherein the policy deviation indicates that the actor corresponding to the identity included in the persona data has made a modification to an element of the distributed computing element outside their list of authorized transaction types.

13. A non-transitory computer program product for detecting policy deviations in a cloud based distributed computing environments comprising a computer readable storage medium having computer readable program code embodied therewith, the program instructions executable by a processor to cause the processor to:
   create, using the processor, an immutable ledger of transaction provenance performed in the cloud based distributed computing environment;
   collect, using the processor, persona data that includes an identity for an actor working in the cloud computing environment, and a list of authorized transactions for the identity, the list of authorized transactions indicating a level of the cloud based distributed computing environment that the identity is authorized to modify;
   plot, using the processor, persona data for transaction types from the immutable ledger of transaction as an bipartite graph, wherein edge weights of the bipartite graphs are correlated to trust levels between personas from the persona data and the transaction types from the immutable ledger;
   employ, using the processor, the rules to detect in real time when a policy deviation in the cloud based distributed computing environment is occurring;
   correlate, using the processor, trust levels from the edge weights to rules illustrating when the transaction provenance indicate a policy deviation in the cloud based distributed computing environment, wherein the policy deviation is indicative of an unauthorized change to infrastructure of the distributed computing environment; and
   perform a corrective action to revert the change to the infrastructure in the cloud based distributed computing environment that triggered the policy deviation being detected by the rules.

\* \* \* \* \*